Jan. 31, 1939.　　　　F. L. MICHAELS　　　　2,145,489
　　　　　　　　　　　　LOGGING STRIP
　　　　　　　　　　Filed Jan. 30, 1935　　　3 Sheets-Sheet 1

Frank L. Michaels Inventor

By Murray and Zugelter

Attorneys

Jan. 31, 1939.                F. L. MICHAELS                    2,145,489
                                LOGGING STRIP
                              Filed Jan. 30, 1935              3 Sheets-Sheet 2

Frank L. Michaels  Inventor

By Murray M. Zugelter
                                   Attorney

Jan. 31, 1939.   F. L. MICHAELS   2,145,489
LOGGING STRIP
Filed Jan. 30, 1935   3 Sheets-Sheet 3

Frank L. Michaels  Inventor

By Murray and Zugelter
Attorneys

Patented Jan. 31, 1939

2,145,489

UNITED STATES PATENT OFFICE 2,145,489

LOGGING STRIP

Frank L. Michaels, Fort Thomas, Ky.

Application January 30, 1935, Serial No. 4,111

3 Claims. (Cl. 281—5)

The present invention relates to improvements in the art of logging oil wells and of making other records of a kindred nature and has for an object the provision of means whereby to materially reduce the time and tedious effort required in producing logs or records of drilling and the like.

Another object of the invention is to provide record strips that are adapted for the simultaneous duplication of records of this nature.

These and other objects are attained by the means described herein and disclosed in the accompanying drawings, in which.

Figure 3:
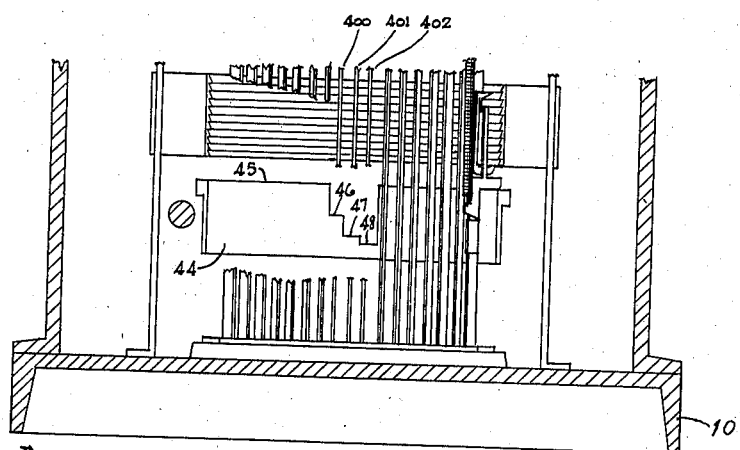
Fig. 3 is a view taken on line 3—3 of Fig. 1.

Heretofore it has long been required that records of the different strata of earth formation evidenced at any site of drilling be accurately and carefully recorded, one record at least being submitted for the information of governmental geological surveys, and amongst larger oil drilling companies, several copies of this record are required for company records. These records are customarily in the form of elongated narrow strips of paper or the like, bearing on a reduced scale a graphic indication of the depth below surface in hundreds of feet and usually subdivided into tens of feet. The thicknesses of the different strata penetrated by the drill are recorded by the drillers, and upon completion of a well, the elongated log strip is prepared, indicating the relative thickness of each stratum with different colored crayons, pencils or the like and marking opposite the same a symbol indicating the geological name of the stratum or the character of the formation drilled. Oil bearing sands, water, gas, etc., are recorded for the various reasons well known to those conversant with the art. Characteristically these different markings are made with any one of seven or more different colors and in an accurately made log where the scale is one hundred feet to the inch, it is customary to make these colored lines as thin as one one-hundredth of an inch ($\frac{1}{100}$″) representing one foot on a scale up to one-tenth of an inch ($\frac{1}{10}$″) representing ten feet on a scale. It is therefore a most fatiguing and painstakingly tedious task to make two or more logs of the same drilling representing in some cases ten thousand foot depths. The frequent exchanging and selecting of different colored pencils as well as the tediousness of accurately blocking off a small portion of the column representing depth consumes a large amount of time. In order to at once minimize the time for making up one of these logging strips and to at the same time provide for the making of an exact duplicate thereof is the primary objective of this invention. To this end means are provided to hold a plurality of logging strips in offset relation so as to expose on each the columns adapted to receive the color spaces and the columns adapted to receive the legend abbreviations commonly employed on the logging strips. The logging strips and machine herein illustrated and hereinafter described are adapted for making the logging strips in duplicate but it will be understood that it is possible by following the teachings of this invention to arrange the strips and alter the machine so that three or more may be made at once. The printable logging strips are made somewhat according to heretofore followed practice, namely, the provision of a longitudinally extending scale set adjacent a narrow blank margin, these strips bearing any suitable heading with customary spaces for data pertaining to the operation. In the present invention, however, the strip has longitudinally spaced perforations arranged in parallel rows, the number of rows corresponding to the number of logging strips to be made at one time (in this instance, two). By overlapping two of these strips so that the first row of perforations on the upper strips coincides with the second row of perforations on the strip beneath, the strips will then present adjacent free marginal areas in perfect longitudinal registry. The machine has separate logging strip guides for each strip and a single feed roller with teeth or pins in the periphery thereof which pass through the registering perforations and thereby retain the sheets in the desired overlapping position throughout the printing operation thereon. The machine is provided with type bars, operable after a general fashion in the manner of typewriter type, with the characters thereon in duplicate and in spaced relation such that when a bar is depressed against a ribbon over the exposed marginal areas, the identical symbol will be printed in the same corresponding place in the corresponding margins of both strips. The type bars and type for printing the colored lines of varying thicknesses are preferably four in number and have varying thicknesses corresponding respectively to one-tenth, one-twentieth, one-fiftieth, and one-hundredth of an inch, thereby enabling the operator by the proper selection of keys to print a line of the desired color of any of these thicknesses. These striking faces are likewise arranged in duplicate and spaced to strike in the proper columns, these four keys being staggered relative to the remainder of the symbol printing keys. The machine is arranged so that the depression of a selected key will condition the logging strip feed to advance the strips longitudinally by an amount equal to the thickness of the line printed by the machine so that the next successive stroke will be added immediately onto the preceding one. If the operator wishes to indicate 100 feet of uniform strata, he would strike the key bearing the thickest line, i. e., one-tenth of an inch, ten successive times and would thereby block out one inch of the column in solid color whereupon the machine and strips would be in position to condition the next printing stroke of whatsoever thickness selected as an accurate and immediate addition to the previously printed block. The printing ribbon for the machine is arranged with a given series of, for example, eight, differently colored adjacent transverse sections repeated throughout the length of the ribbon. Means are provided to quickly and manually reel such ribbon back or forth to bring a desired color in position for printing. A ribbon guide, clamping, and shifting means is provided for automatic releasing, clamping and shifting to and from the field of operation by the normal operation of the machine so that the operator in making up the logging strips merely places his record sheet before him, manipulates the ribbon for selection of colors with the left hand, and strikes the desired keys with the right hand.

With this device it is possible for an operator of ordinary intelligence and skill, to complete two identical accurate logging strips in a matter of fifteen minutes or so whereas, with the presently pursued methods, such a task might consume a large portion of a day. The element of fatigue which is considerable in present methods is completely eliminated by the present invention.

Referring now to the drawings, the device comprises an automatic spacing means under the control of the operating keys, a means to automatically advance a pair of logging strips under the control of said spacing means, a ribbon guide, lock and shifter mechanism also controlled by the operation of the operating key mechanism and a manually controlled ribbon color selector reel mechanism. The automatic spacing feed is adapted to be de-clutched to provide for manual shifting of the logging strips if and when necessary.

The machine comprises a base 10, a removable housing cover 11 apertured at the forward end as shown at 12 to expose the paper holding and feed mechanism which is conveniently mounted as a unit having its base 13 secured in any suitable manner to the forward end of base 10. The feed and spacing mechanism comprises a pair of uprights 14 mounted on base 10 and carrying between them a shaft 15 on which is rockably mounted an open rectangular counter-weighted pawl-carrying frame having the spaced side members 16. A pawl 17 is pivoted on a suitable rod or axle between the frame members 16. The rockable frame 16 is normally retained in a horizontal or zero position by springs 18 which yield when the frame is depressed by the operating keys and allow the pawl 17 to be raised according to the predetermined depth of the key stroke. Rotatably mounted upon shaft 15 is a toothed wheel 19 with which the pawl cooperates on the return of the frame under the force of spring 18. Toothed wheel 19 is fixed on shaft 15 which also has a bevel gear 20 fixed on one end thereof meshing with a bevel gear 21 on a longitudinally extending shaft 22. Shaft 22 effects a driving connection between toothed pawl 19 and the mechanism whereby the paper feed is controlled. This is effected through a pinion 23 on shaft 22 meshing with an idler 24 which in turn meshes with pinion 25 that is bodily shiftable in the direction of its axis by means of a manually depressible shaft 26. The clutch pinion 25 normally meshes with toothed wheel 27 which is fixed on the shaft with feed roll 28. Upon depressing shaft 26 with the exposed finger piece, pinion 25 is shifted longitudinally out of mesh with wheel 27 thereby permitting manual rotation of the feed roll 28 by means of knob 29. This declutching operation is utilized in initially positioning the logging strips in the machine. The peripheral pins 20 on feed roll 28 are adapted to enter the registering perforations 31 in the overlapping pair of logging strips 32 and 33. An opposed pair of strip guides 34—34 receive the lower logging strip 32. A second pair of logging strip guides 35—35 receive the upper logging strip 33 and are in offset relation to the guides 34—34 so that the outermost longitudinal row of perforations 31 in the upper logging strips will register with the innermost lower logging strip. This means in conjunction with the pins on the feed roll 28 serves to hold the logging strips against relative lateral and longitudinal shift and also enable the shifting in unison according to the amount of movement imparted to the feed roll through the gear train and feed shaft just described.

The operating keys and the keyboard are conveniently arranged in a group that is readily controllable with the fingers of one hand. The operating key-bars 36 and 37 and 38 may be conveniently arranged in three rows above the casing 11 which is conveniently bulged or ridged as at 39 to form a hand rest just forwardly thereof. There are four of these keys, preferably grouped near the center of the keyboard and representing the different line thicknesses that are printable with the machine. A total of about thirteen additional keys bearing abbreviated symbols customarily used are deemed sufficient for all other printing necessary for the making up of logging strips. The key bars 40 are arranged in an arc and are guided through a slotted guide bar 41 which is a projection of an anchor standard 42 to which the springs 43 are connected at one end. Springs 43 are provided one for each key-bar 40. The vertical portions of the key-bars 40 are adapted respectively to strike the arcuate forward cross member 44 comprising part of the rockable frame 16. From inspection of Fig. 3 it will be appreciated that the ends of the vertical key-bars will normally strike the top face 45 of the member 44 so that all save three of the keys will depress the rocking frame a uniform distance, thus moving the pawl 17 correspondingly for subsequent feed of feed roll 28. All of the symbol keys strike and one of the line forming keys strikes on this common level. The member 44 has offsets 46, 47, and 48 cut therein to different depths and three of the key-bars, namely, 400, 401, and 402, are adapted to be correspondingly depressed before imparting any movement to the rocking frame and thus advance the pawl 17 by correspondingly lesser amounts. The key 402 is thus arranged to cause the rocking frame to impart $1/100$ of an inch feed after printing a colored line of corresponding thickness. The key 401 imparts a slightly greater movement representing $1/50$ of an inch feed. The key 400 imparts a greater movement, namely, $1/20$ of an inch, while the key 403 which strikes on the top surface 45 imparts a feed of $1/10$ of an inch.

Each key-bar has a pivoted latch 49 thereon which cooperates with a serrated rack 50 to preclude rise of the key under the influence of spring 43 until it has been completely depressed and has thereby released the latch from the rack. Through the agency of this mechanism, it is impossible for the operator to accidentally impart some unintended partial feed to the device without marking the logging strips. The type bars 51 are pivoted on a rod 52 in an arcuate slotted support 53 and are adapted to be moved about their pivots by the corresponding key bars through the agency of the slotted extensions 54 engaging pins 55 on the type bars. The type 55 are transversely slotted as at 56 so that uniform faces 57 occur on opposite sides thereof, these faces bearing the type symbols or being blank and of graduated thicknesses as hereinbefore described. The slots 56 in the color line marking type are arranged to span the intervening column in which the symbols are printed on the outer logging strip. The corresponding slots in the symbol type span the column in which the lines are color-printed on the innermost logging strip.

Figure 1:
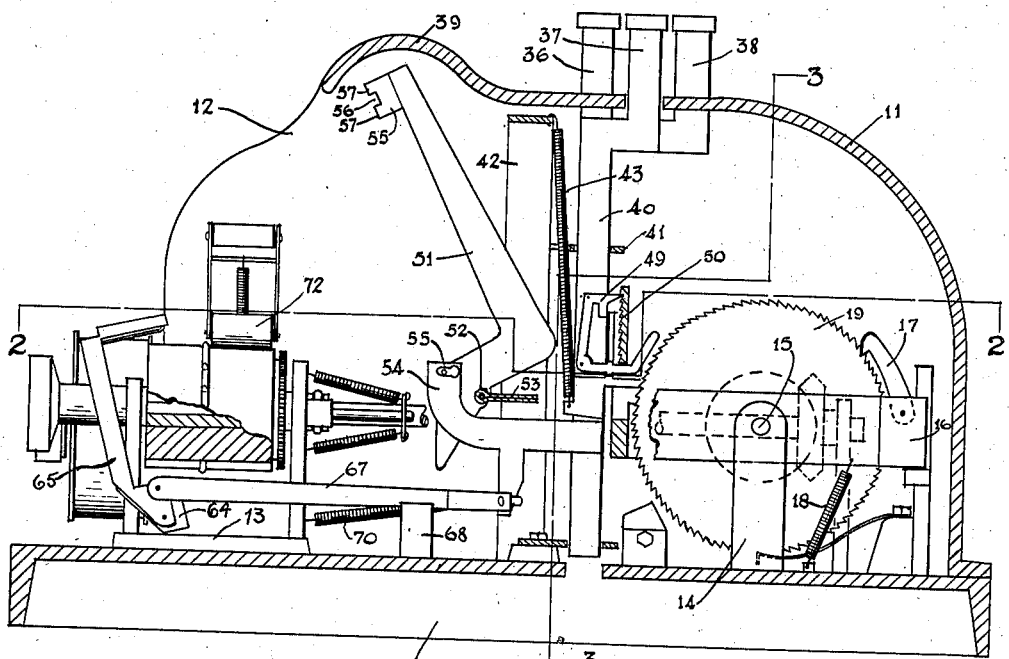
Fig. 1 is a sectional view of the apparatus of the invention taken on line 1—1 of Fig. 2.
Figures 2, 6:
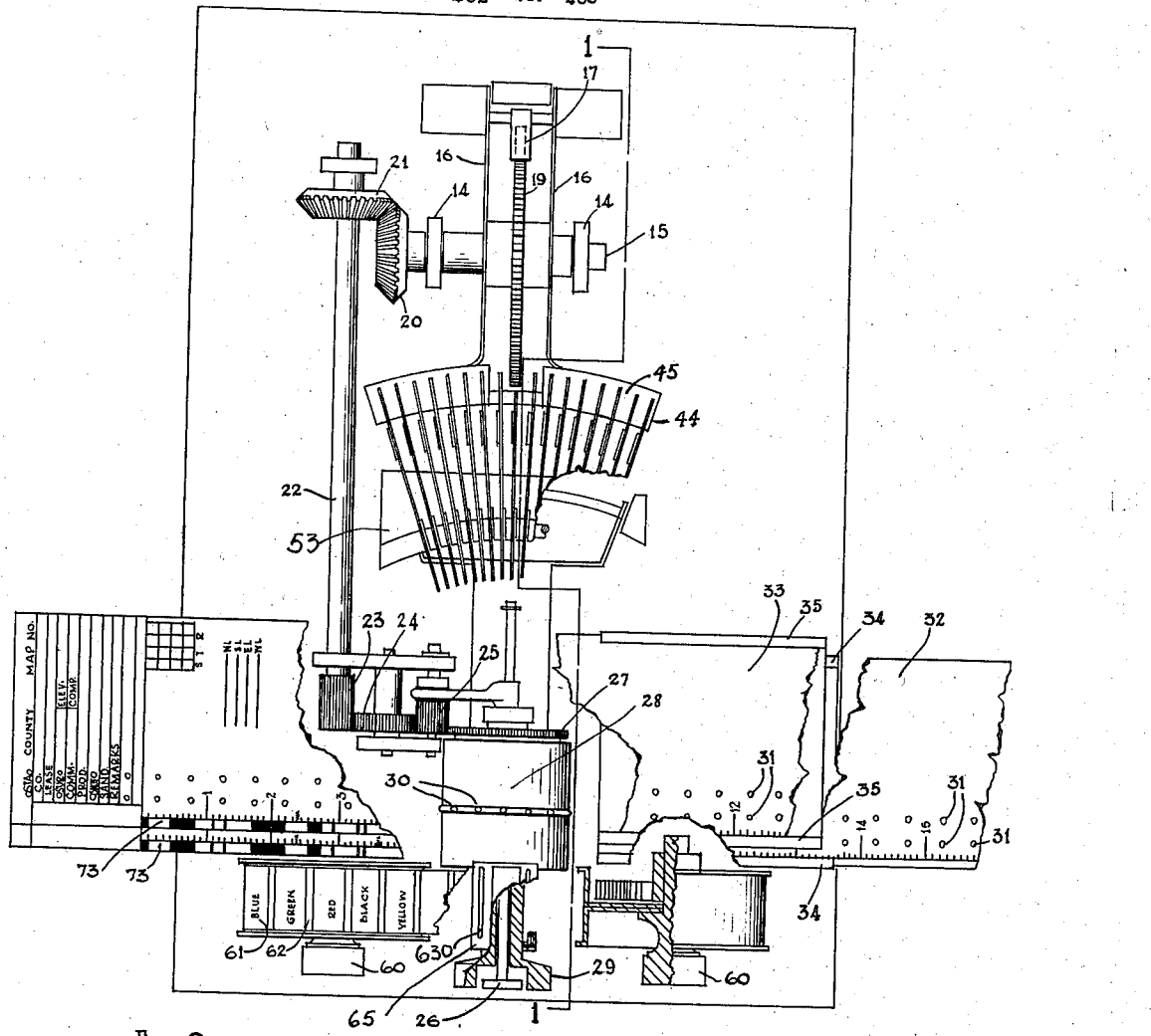
Fig. 2 is a view taken on line 2—2 of Fig. 1.
Fig. 6 is a schematic keyboard lay-out for the device of the invention.
Figure 5:
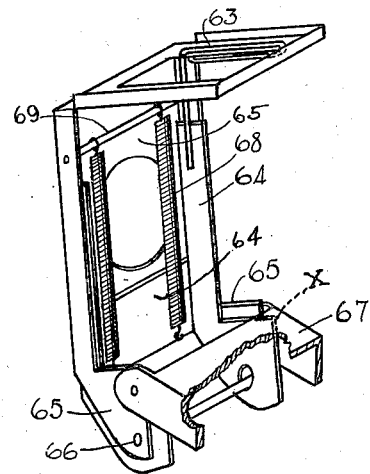
Fig. 5 is an enlarged fragmental isometric view of a ribbon holder and guide forming a detail of the invention.
Figure 4:
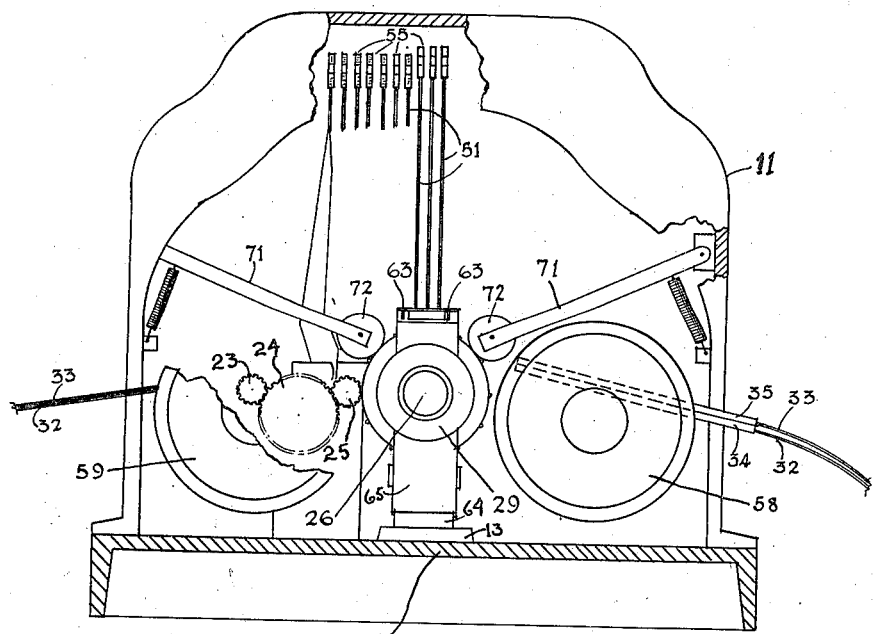
Fig. 4 is a front elevational view of the device, part broken away.

As will be noted in Figs. 1, 2, and 4 a pair of ribbon carrying reels 58 and 59 are provided at the forward end of the machine, said reels being operable by handle knobs 60. The ribbon 61 is of unique style in that it contains successive transverse areas of blue, green, red, black, yellow, etc. between adjacent blocks of which are uninked spaces 62. It will be noted, particularly in Fig. 2, that the ribbon normally extends between the reels and is disposed forwardly of the field of printing operation of the type bars on the platen and feed roll 28. The ribbon passes through a pair of spaced wire loop members 63 carried by a pivoted ribbon holder and shifter assembly (see particularly Fig. 5) said member having a frame comprising inner members 64 and outer members 65 pivotally mounted together for relative lost motion on a shaft or pin 66 adjacent the base portion 13. The loops 63 which are fixed to member 64 move into slots 630 in the top of member 65 to wedge the ribbon tightly against movement. A channel-shaped connector link 67 is guided on upright members 68 and pivoted to members 65 above shaft 66 so that movement of members 54 will rock the ribbon holder and shifter forwardly and produce a clamping action by releasing corners X of members 64 from the pressure of member 67. The spring 68 connects the bottom of member 64 and the lateral bar 69 between sides and near the top of member 65 and effects a clamping action on the ribbon which is thus shifted in the plane of its width over into the field of the printing type. When the key is released, spring 70 rocks the ribbon shifter back to its initial position and releases the clamping action on the ribbon. Member 65 is apertured to receive the hub of handle 29.

As can be best seen in Fig. 4, spring urged arms 71 carrying rollers 72 on the free ends thereof retain the paper logging strips smoothly on the platen or feed roll 28.

The operation of the device is as follows. To insert the logging strip into the machine, the levers 71 are first raised clear of the platen and feed roll 28 whereupon one of the logging strips 32 is inserted between the guides 34 and a second logging strip 33 is inserted between guides 35. The leading ends of the strip are then manually brought into registry whereupon it will be found that the outermost row of perforations 31 in the upper logging strip 33 will be found in registry with the innermost row of perforations in the lower logging strip 32. The pins 30 are now entered into the registering perforations 31 in the heading portion of the logging strips whereupon the roller carrying levers 71 are dropped into position onto the strips. The machine is now ready for operation. The operator desiring to indicate a given thickness in the color columns 73 would strike one of the keys marked 1, 2, 5, or 10, in Fig. 6, whereupon the corresponding type bar would descend and the blank type faces of corresponding thicknesses would be printed through the selected color on the ribbon onto the said margins. The downward movement of the key-bar would rock the frame 16 thereby lifting the pawl a given number of teeth over the toothed wheel 19 while the type bar in descending would also actuate the mechanism for clamping the ribbon and shifting it over the field of printing operation. When the key-bar is released, the spring 18 returns the rocking frame to initial position and the pawl thereon engaging toothed wheel 19 advances the toothed wheel clockwise a corresponding amount. This operation is repeated with the same or other keys, thereby progressively filling the color of strata column with successive contiguous marks, the following feed of the logging strips always corresponding to the degree of rocking that was imparted to the frame 16 by the particular key depressed. The selection of color on the ribbon is effected by manual turning of knobs 60 until the desired block of colored ribbon is in position in the aperture in the ribbon holder and shifter. The production of logging strips may be carried on as rapidly as the operator is able to read the data supplied for the preparation thereof.

Any manner of elongated strips for other record or graph or logging purposes that is practicably adapted for longitudinally successive marking may be made on machines of the type described.

What is claimed is:

1. Logging sheets adapted for machine printing and comprising elongated strips of paper and the like having an edge margin, a footage scale adjacent said edge margin and having uniform rows of longitudinally and laterally spaced perforations disposed nearer to one edge of the strip than to the other edge adapted for registration with selected different rows in similar strips and comprising means whereby said strips may be retained in predetermined laterally stepped overlapping and relatively nonshifting relation.

2. A logging sheet comprising an elongated strip bearing marginal columns, said strip having inwardly of said columns a plurality of laterally spaced longitudinally extending rows of perforations disposed nearer to one edge of the strip than to the other edge for aligning said strip in predetermined superposed marginally stepped relation with a similar strip wherein the body of the uppermost strip covers the perforations in the strip below.

3. A logging strip for oil wells and the like comprising an elongated narrow sheet having a printable marginal surface and having two uniform rows of perforations spaced inwardly of the marginal edge of said strip and disposed nearer to one edge of the strip than to the other edge and a footage scale between the printable margin and the adjacent row of perforations, said rows of perforations being so spaced laterally from each other and from the edge of the strip as to effect side by side and edge to edge positioning of the marginal surfaces of a pair of said logging strips when superposed with one of said rows of perforations in registry with the non-corresponding row of perforations in a similar strip.

FRANK L. MICHAELS.